(12) United States Patent
Hu et al.

(10) Patent No.: US 11,906,795 B2
(45) Date of Patent: Feb. 20, 2024

(54) FIBER OPTIC CONNECTOR ASSEMBLY WITH CRIMP TUBE SUBASSEMBLY AND METHOD OF USE

(71) Applicant: Senko Advanced Components, Inc., Marlborough, MA (US)

(72) Inventors: Guanpeng Hu, Shanghai (CN); Anthony Croxford, Basingstoke (GB); Man Kit Joe Wong, Kowloon (HK)

(73) Assignee: Senko Advanced Components, Inc., Hudson, MA (US)

( * ) Notice: Subject to any disclaimer, the term of this patent is extended or adjusted under 35 U.S.C. 154(b) by 0 days.

(21) Appl. No.: 16/904,068

(22) Filed: Jun. 17, 2020

(65) Prior Publication Data

US 2020/0400897 A1 Dec. 24, 2020

Related U.S. Application Data

(60) Provisional application No. 62/863,486, filed on Jun. 19, 2019.

(51) Int. Cl.
*G02B 6/38* (2006.01)

(52) U.S. Cl.
CPC ......... *G02B 6/3889* (2013.01); *G02B 6/3857* (2013.01); *G02B 6/3894* (2013.01)

(58) Field of Classification Search
CPC ... G02B 6/3857; G02B 6/3894; G02B 6/3889
See application file for complete search history.

(56) References Cited

U.S. PATENT DOCUMENTS

| 4,205,896 | A | * | 6/1980 | Borsuk | ................ | G02B 6/3843 |
| | | | | | | 385/87 |
| 4,615,031 | A | * | 9/1986 | Eales | .................. | H01S 5/02208 |
| | | | | | | 385/94 |
| 6,116,790 | A | | 9/2000 | Vergeest | | |
| 6,409,393 | B1 | | 6/2002 | Grois et al. | | |
| 6,542,674 | B1 | | 4/2003 | Gimblet | | |

(Continued)

FOREIGN PATENT DOCUMENTS

| EP | 3318907 A1 | 5/2018 |
| JP | 2011022526 A | 2/2011 |

(Continued)

OTHER PUBLICATIONS

Extended European Search Report EP20181060, dated Oct. 10, 2020, 11 pages.

*Primary Examiner* — Sung H Pak
*Assistant Examiner* — Hoang Q Tran

(57) ABSTRACT

A fiber optical connector assembly with a crimp tube assembly improves tensile load on the optical fiber cable or microduct jacket when the connector assembly is used as part of an optical network that is secured between towers spaced apart 1,000 meters or more. The crimp tube assembly has one or more crimp zones, and the crimp tube assembly has a lip formed on an inner surface of the crimp right assembly to improve tensile strength when the crimp tube assembly is secured to a back post of a first fiber optic connector assembly that is air blown or push through a duct or conduit. An epoxy resin may be injected into a cavity between the cable jacket and the crimp tube assembly to improve tensile load strength.

13 Claims, 8 Drawing Sheets

(56) References Cited

U.S. PATENT DOCUMENTS

| | | |
|---|---|---|
| 6,546,175 B1 | 4/2003 | Wagman |
| 6,585,423 B1 | 7/2003 | Vergeest |
| 6,648,520 B2 | 11/2003 | McDonald |
| 6,714,710 B2 | 3/2004 | Gimblet |
| 6,785,450 B2 | 8/2004 | Wagman |
| 6,899,467 B2 | 5/2005 | McDonald |
| 6,908,233 B2 | 6/2005 | Nakajima et al. |
| 7,001,079 B2 | 2/2006 | Vergeest |
| 7,090,406 B2 | 8/2006 | Melton |
| 7,090,407 B2 | 8/2006 | Melton |
| 7,111,990 B2 | 9/2006 | Melton |
| 7,113,679 B2 | 9/2006 | Melton |
| 7,118,283 B2 | 10/2006 | Nakajima et al. |
| 7,234,875 B2 | 6/2007 | Krowiak |
| 7,241,056 B1 | 7/2007 | Kuffel |
| 7,264,402 B2 | 9/2007 | Theuerkorn |
| 7,281,856 B2 | 10/2007 | Grzegorzewska |
| 7,344,317 B2 | 3/2008 | Krowiak |
| 7,429,136 B2 | 9/2008 | Lewallen |
| 7,467,896 B2 | 12/2008 | Melton |
| 7,476,035 B2 | 1/2009 | Cull et al. |
| 7,539,380 B1 | 5/2009 | Abernathy et al. |
| 7,559,700 B2 | 7/2009 | Eguchi et al. |
| 7,567,741 B2 | 7/2009 | Abernathy et al. |
| 7,572,065 B2 | 8/2009 | Lu |
| 7,621,675 B1 | 11/2009 | Bradley |
| 7,654,747 B2 | 2/2010 | Theuerkorn |
| 7,654,748 B2 | 2/2010 | Kuffel |
| 7,744,286 B2 | 6/2010 | Lu |
| 7,744,288 B2 | 6/2010 | Lu |
| 7,762,726 B2 | 7/2010 | Lu |
| 7,785,015 B2 | 8/2010 | Melton |
| 7,785,019 B2 | 8/2010 | Lewallen |
| 7,796,853 B2 | 9/2010 | Abernathy et al. |
| 7,881,576 B2 | 2/2011 | Melton |
| 7,891,882 B2 | 2/2011 | Kuffel |
| 7,918,609 B2 | 4/2011 | Melton |
| 7,942,590 B2 | 5/2011 | Lu |
| 7,959,361 B2 | 6/2011 | Lu |
| 8,052,333 B2 | 11/2011 | Kuffel |
| 8,202,008 B2 | 6/2012 | Lu |
| 8,231,282 B2 | 7/2012 | Kuffel |
| 8,297,850 B2 | 10/2012 | Nishioka |
| 8,348,519 B2 | 1/2013 | Kuffel |
| 8,414,196 B2 | 4/2013 | Lu |
| 8,496,384 B2 | 7/2013 | Kuffel |
| 8,506,173 B2 | 8/2013 | Lewallen |
| 8,573,859 B2 | 11/2013 | Larson |
| 8,672,560 B2 | 3/2014 | Haley |
| 8,699,467 B2 | 4/2014 | Lindoff |
| 8,714,835 B2 | 5/2014 | Kuffel |
| 8,770,862 B2 | 7/2014 | Lu |
| 8,814,441 B2 | 8/2014 | Strasser et al. |
| 8,840,320 B2 | 9/2014 | Park |
| 8,939,654 B2 | 1/2015 | Lu |
| 9,103,995 B2 | 8/2015 | Park |
| 9,239,441 B2 | 1/2016 | Melton |
| 9,291,780 B2 | 3/2016 | Lu |
| 9,304,262 B2 | 4/2016 | Lu |
| 9,310,570 B2 | 4/2016 | Busse |
| 9,397,441 B2 | 7/2016 | Sun |
| 9,442,257 B2 | 9/2016 | Lu |
| 9,482,829 B2 | 11/2016 | Lu |
| 9,519,114 B2 | 12/2016 | Zimmel |
| 9,535,230 B2 | 1/2017 | Newbury |
| 9,664,862 B2 | 5/2017 | Lu |
| 9,684,138 B2 | 6/2017 | Lu |
| 9,733,436 B2 | 8/2017 | Van Baelen |
| 9,739,951 B2 | 8/2017 | Busse |
| 9,854,151 B2 | 12/2017 | Endo |
| 9,964,715 B2 | 5/2018 | Lu |
| 9,983,366 B2 | 5/2018 | Bund |
| 10,012,802 B2 | 7/2018 | Newbury |
| 10,101,538 B2 | 10/2018 | Lu |
| 10,114,176 B2 | 10/2018 | Gimblet |
| 10,146,015 B2 | 12/2018 | Zimmel |
| 10,162,126 B2 | 12/2018 | Elenbaas |
| 10,180,541 B2 | 1/2019 | Coenegracht |
| 10,197,739 B2 | 2/2019 | Ohtsuka |
| 10,234,641 B2 | 3/2019 | Hill |
| 10,317,628 B2 | 6/2019 | Van Baelen |
| 10,338,323 B2 | 7/2019 | Lu |
| 10,401,578 B2 | 9/2019 | Coenegracht |
| 10,451,811 B2 | 10/2019 | Coenegracht |
| 10,473,866 B2 | 11/2019 | Newbury |
| 10,502,907 B2 | 12/2019 | Wang |
| 10,613,278 B2 | 4/2020 | Kempeneers et al. |
| 10,649,152 B1 * | 5/2020 | Yang ................ G02B 6/3849 |
| 11,360,282 B2 * | 6/2022 | Coenegracht ........ G02B 6/4441 |
| 2005/0281510 A1 * | 12/2005 | Vo ........................ G02B 6/387 |
| | | 385/60 |
| 2006/0045428 A1 | 3/2006 | Theuerkorn |
| 2008/0273855 A1 | 11/2008 | Bradley |
| 2008/0310796 A1 * | 12/2008 | Lu ........................ G02B 6/3825 |
| | | 385/72 |
| 2009/0087147 A1 * | 4/2009 | Barnes ................ G02B 6/3888 |
| | | 385/72 |
| 2009/0257717 A1 | 10/2009 | Liu |
| 2010/0329267 A1 | 12/2010 | Sakamoto |
| 2011/0222826 A1 | 9/2011 | Blackburn |
| 2013/0136398 A1 | 5/2013 | Isenhour |
| 2014/0133808 A1 * | 5/2014 | Hill ..................... G02B 6/3878 |
| | | 385/84 |
| 2017/0227719 A1 | 8/2017 | Zimmel |
| 2018/0224610 A1 | 8/2018 | Pimentel |
| 2018/0231720 A1 | 8/2018 | Lu |
| 2019/0107667 A1 | 4/2019 | Huang |
| 2019/0107677 A1 | 4/2019 | Coenegracht |
| 2019/0146161 A1 | 5/2019 | Elenbaas |
| 2019/0179088 A1 | 6/2019 | Zimmel |
| 2019/0235177 A1 | 8/2019 | Lu |
| 2019/0302389 A1 | 10/2019 | Newbury |
| 2019/0324217 A1 | 10/2019 | Lu |
| 2019/0369336 A1 | 12/2019 | Van Baelen |
| 2020/0003965 A1 | 1/2020 | Coenegracht |
| 2020/0012051 A1 | 1/2020 | Coenegracht |
| 2020/0241218 A1 | 7/2020 | Kempeneers et al. |

FOREIGN PATENT DOCUMENTS

| | | |
|---|---|---|
| JP | 201220799 A | 11/2012 |
| WO | WO2010039830 A2 | 4/2010 |
| WO | WO2010039830 A3 | 6/2010 |
| WO | 2015174355 A1 | 11/2015 |
| WO | WO2016073273 A2 | 5/2016 |
| WO | WO2016073273 A3 | 6/2016 |
| WO | WO2018157115 A1 | 8/2018 |
| WO | WO2019173350 A1 | 9/2019 |

\* cited by examiner

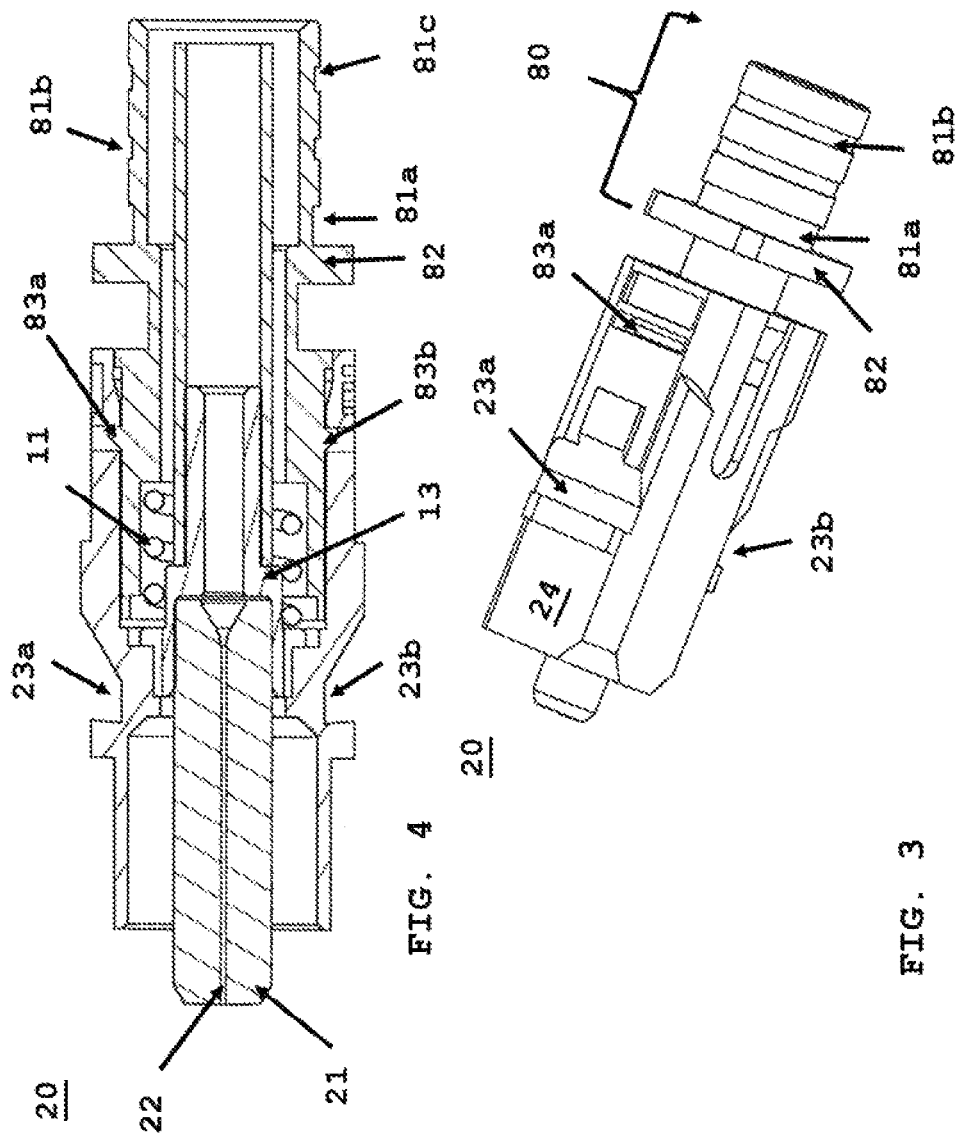

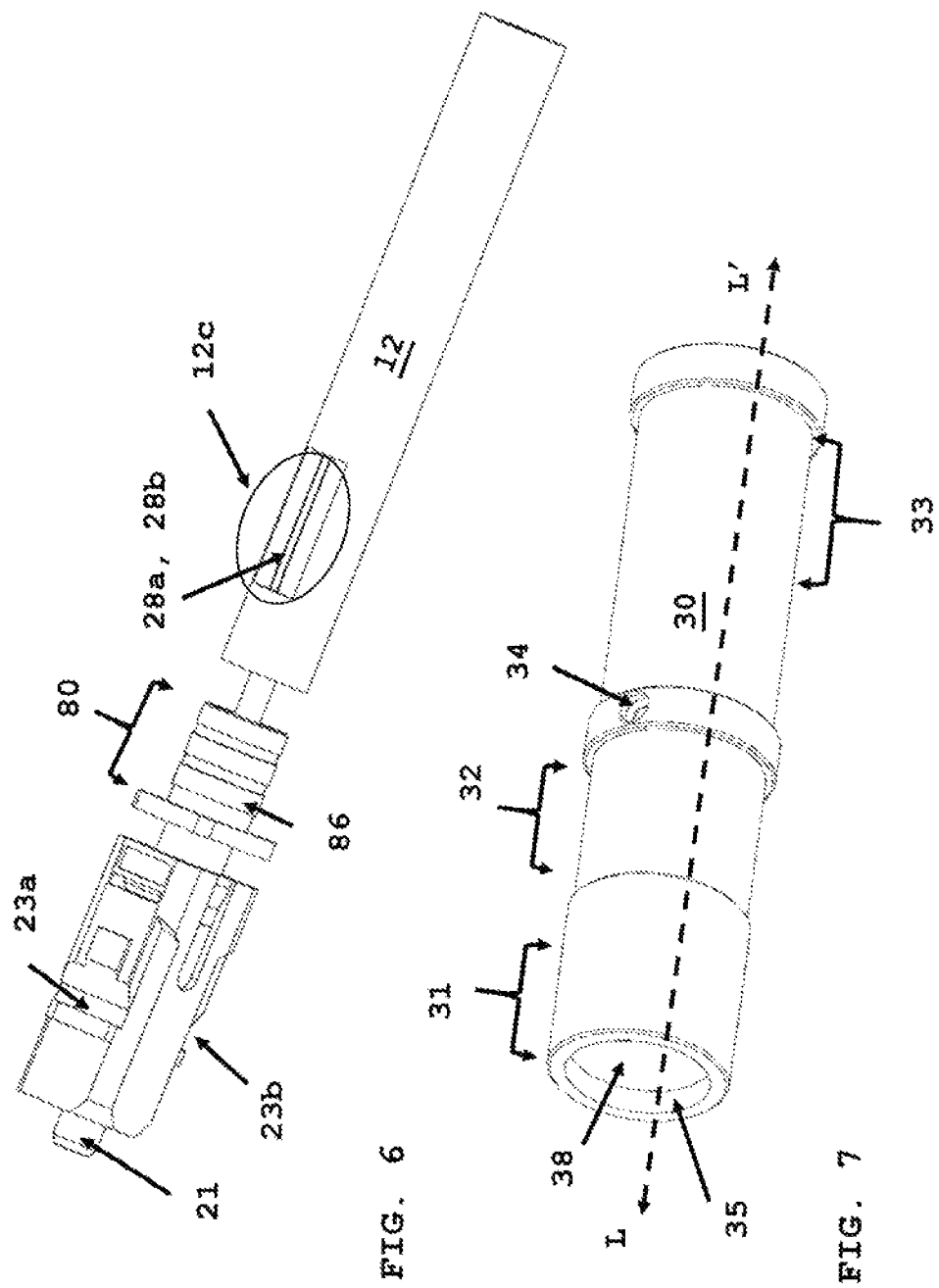

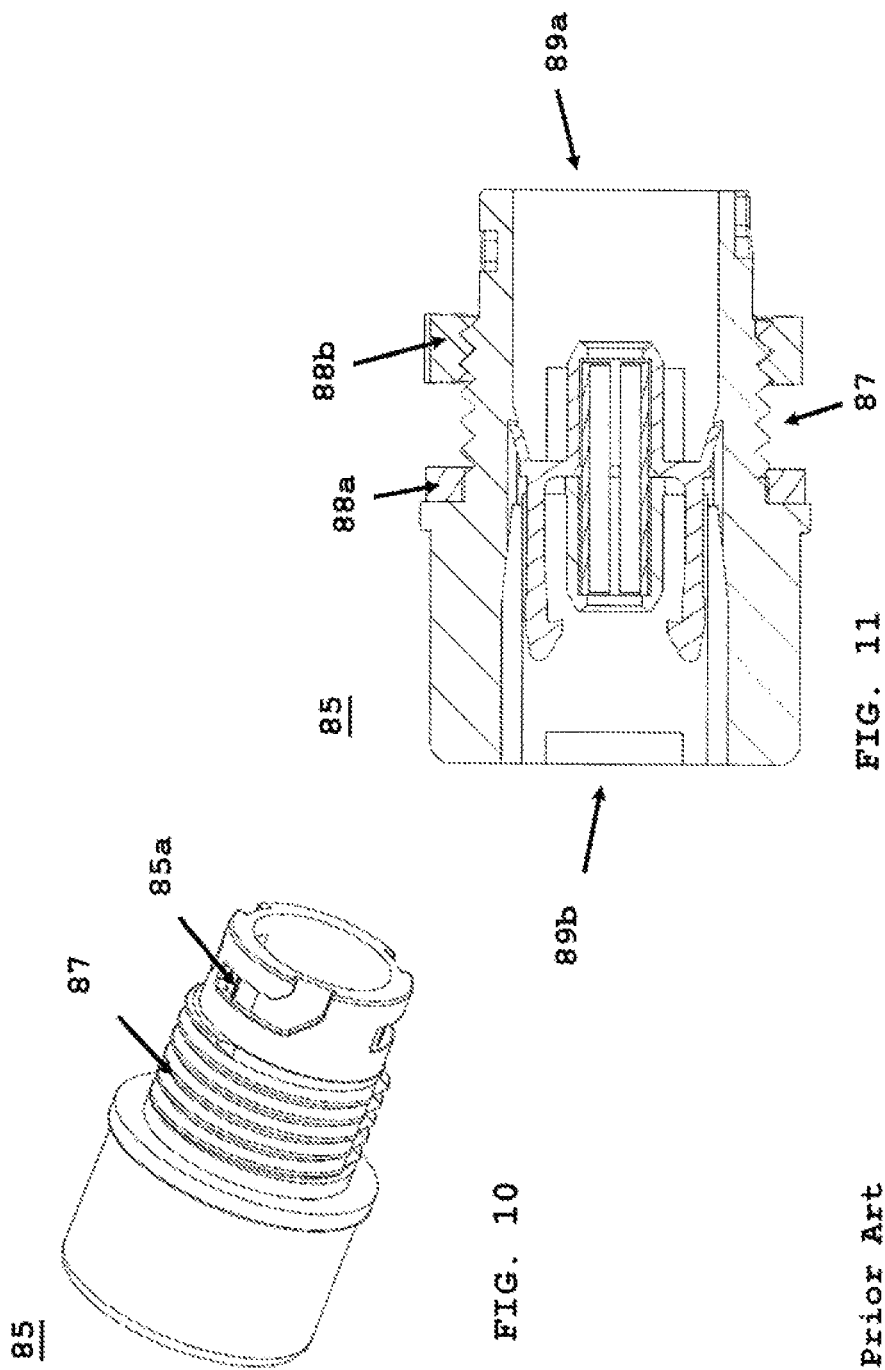

FIBER OPTIC CONNECTOR ASSEMBLY WITH CRIMP TUBE SUBASSEMBLY AND METHOD OF USE

CROSS-REFERENCE TO RELATED-APPLICATIONS

This present application claims the benefit of priority of U.S. Provisional Application No. 62/863,486 filed on Jun. 19, 2019, which is fully incorporated herein by reference in its entirety.

FIELD OF INVENTION

The present disclosure relates generally to fiber optic connector assemblies comprising an inner fiber optic connector in communication with an incoming fiber optic cable. The inner or first fiber optic connector assembly further comprises a crimp tube assembly with at least two crimping zones, and an inner lip is received within an annular recess formed as part of the backpost or backbody of the fiber optic connector. The crimp assembly may be configured to receive a resin or epoxy to bond the fiber optic cable jacket within the crimp tube assembly.

BACKGROUND

The prevalence of the Internet has led to unprecedented growth in communication networks. Consumer demand for service and increased competition has caused network providers to continuously find ways to improve quality of service while reducing cost.

Certain solutions have included deployment of high-density interconnect panels. High-density interconnect panels may be designed to consolidate the increasing volume of interconnections necessary to support the fast-growing networks into a compacted form factor, thereby increasing quality of service and decreasing costs such as floor space and support overhead. However, the deployment of high-density interconnect panels has not been fully realized. By providing different release types as part of the same fiber optic connector assembly, a user can reduce on-hand inventory, decrease installation and maintenance time, as the network configuration becomes more complicated.

In communication networks, such as data centers and switching networks, numerous interconnections between mating connectors may be compacted into high-density panels. Panel and connector producers may optimize for such high densities by shrinking the connector size and/or the spacing between adjacent connectors on the panel. While both approaches may be effective to increase the panel connector density, shrinking the connector size and/or spacing may also increase the support cost and diminish the quality of service.

In a high-density panel configuration, adjacent connectors and cable assemblies may obstruct access to individual release mechanisms. Such physical obstructions may impede the ability of an operator to minimize the stresses applied to the cables and the connectors. For example, these stresses may be applied when a user removes the connector assembly from an adapter using by pulling on the fiber optic cable. Additionally during installation the fiber optic cable is under stress when the user is pulling and pushing on the cable. In use, the cable may become stressed with water or snow accumulating on it. Overstressing the cables and connectors may produce latent defects, compromise the integrity and/or reliability of the terminations, and potentially cause serious disruptions to network performance.

An application that may use the present invention is pulling, pushing, or air blowing a first fiber optic connector assembly comprising a fiber optic connector and an optical fiber connected thereto, through a microduct or a duct. A microduct is considered to have a small outside and inside diameter. The microduct can replace the fiber optic cable jacket. A microduct is a small outer diameter tube that receives the optical fiber assembly with an upper diameter of 20 mm. Typical microducts are 5 mm outside diameter with an inner diameter of 3.5 mm. The fiber assembly is usually air blown a distance of 500 to 1500 meters under an air pressure of 10 bars. Microducts are used in direct buried or below the ground installations, within existing ducts in building or aerial installations suspended between towers or utility poles. There is a need to ensure the inner or first fiber optic connector assembly is secured to the optical fiber cable, under high tensile loads up to 650 Newtons.

SUMMARY

In summary, one embodiment of the present connector assembly, a fiber optical connector assembly has an outer connector housing that receives the air blown first fiber optic connector assembly secured to the incoming optical fiber cable using a crimp tube assembly. Without departing from the scope of the invention, an epoxy or resin may be injected to further secure the cable jacket within the crimp tube assembly. The crimp tube assembly is crimped to the backpost of the inner fiber optic connector. A lip formed on the inner surface of the crimp tube assembly is received in an annular recess or groove formed as part of a backpost of the first fiber optic connector assembly. In another embodiment, the cable jacket is scored exposing the strength members. The injected resin covers the strength members and the resin bonds the cable jacket and strength members to the inner surface of the crimp tube assembly.

In another embodiment of the present invention, the crimp ring assembly has two or more crimp zones. A first zone further comprises a lip that is secured to the backpost. A second crimp zone seals the crimp tube assembly to the cable jacket. The third crimp zone secures the crimp tube assembly against the cable jacket surrounded by the injected resin. The tensile load on the fiber optic cable can be as high as 650 Newtons.

In another embodiment, a method of assembling the crimp tube assembly to the inner fiber optic connector is disclosed. The first fiber optic connector assembly is formed with an inner or first fiber optic connector with a backpost is configured to receive the crimp tube assembly. The crimp tube assembly secures a cable jacket or microduct, comprising an optical fiber (sheathed or not coated) and may contain one or more strength members therein, such as glass rods of 1-2 mm in diameter, to the backpost of the inner or first fiber optic connector assembly. The first fiber optic assembly without a connector outer housing is air blown through a micro duct. The first fiber optic assembly is secured within the connector outer housing, a coupling nut secures the fiber optical connector assembly formed from the outer housing and fiber optic assembly to an adapter port, and is locked to the adapter port with a lock ring. A co-pending application, U.S. Pat. No. 10,396,512B2, Gniadek, (application Ser. No. 15/693,842) describes a coupling nut, lock ring and outer connector housing capable of receiving the fiber optic assembly with the crimp tube assembly according to the present invention. Application Ser. No. 15/693,842 is fully incorporated by reference into the present invention.

BRIEF DESCRIPTION OF THE DRAWINGS

FIG. 3 is a perspective view of the inner or first fiber optic connector assembly;

FIG. 4 is a cross-section view of FIG. 3;

FIG. 6 is a perspective view of a cable jacket prior to crimping onto the inner of first fiber optic connector assembly;

FIG. 7 is a perspective view of a crimp tube assembly according to the present invention;

FIG. 10 is a prior art adapter that can accept the connector assembled of FIG. 1, and FIG. 11 is a cross-section of FIG. 10.

Corresponding reference numbers indicate corresponding parts throughout the drawings.

DETAILED DESCRIPTION

As used herein, the term "optical fiber" is intended to apply to all types of single mode and multi-mode light waveguides, including one or more bare optical fibers, coated optical fibers, polymer optical fiber (POF), loose-tube optical fibers, tight-buffered optical fibers, ribbonized optical fibers, bend performance optical fibers, bend insensitive optical fibers, nanostructured optical fibers or any other expedient for transmitting light signals. The term optical fiber cable may further include multi-fiber optic cables having a plurality of the optical fibers.

A "fiber optic cable" or an "optical cable" refers to a cable containing one or more optical fibers for conducting optical signals in beams of light. The optical fibers can be constructed from any suitable transparent material, including glass, fiberglass, and plastic. The cable can include a jacket or sheathing material surrounding the optical fibers. In addition, the cable can be connected to a connector on one end or on both ends of the cable. A fiber optic cable comprises an optical fiber, strength members and an outer cable jacket. A cable jacket is defined to include a generally circumferential tube that is sized and shaped to contain at -least one or more optical fiber assembly comprising an optical fiber that may be sheathed or coated and may contain one or more strength members. Ducts or microducts are detailed in industry standards such as European standard (EN) 50411-6-1, IEC 60794-5 6-1 for blown cable or IEC 60794-5-20 for blown microducts and bundles. A duct is considered a cable jacket.

For connection of cables together or with other fiber optic devices, the terminal ends of a cable may include a connector. A "connector," as used herein, refers to a device and/or components thereof that connects a first module or cable to a second module or cable. The connector may be configured for fiber optic transmission or electrical signal transmission. The connector may be any suitable type now known or later developed, such as, for example, a ferrule connector (FC), a fiber distributed data interface (FDDI) connector, an LC connector, a mechanical transfer (MT) connector, a square connector (SC) connector, an SC duplex connector, a straight tip (ST) connector, or a behind-the-wall (BTW) connector. The connector may generally be defined by a connector housing body. In some embodiments, the housing body may incorporate any or all of the components described herein.

Figure 1:
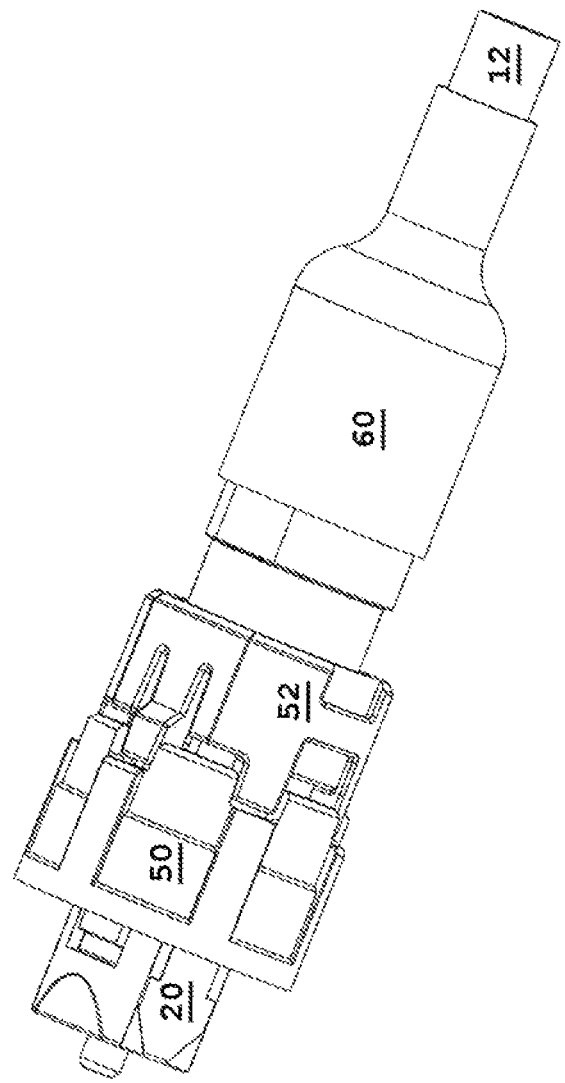
FIG. 1 is a perspective view of the assembly fiber optical connector assembly according to the present invention.

FIG. 1 depicts an assembled fiber optical connector assembly (10). Connector assembly (10) comprises an inner or first fiber optic connector assembly (20), outer connector housing (40), coupling nut (50), lock ring (52), crimp tube assembly (30) (refer to FIG. 2), a fiber optic cable (12) and heat shrinkable tubing (60) over a distal end of the fiber optical connector assembly (10). The tubing (60) helps prevent ingress of moisture and debris that may be found in ducts or outdoors, and the tubing (60) helps improve the tensile load that can be placed on the optical cable (12) or the first fiber optic connector assembly (20).

Figure 2:
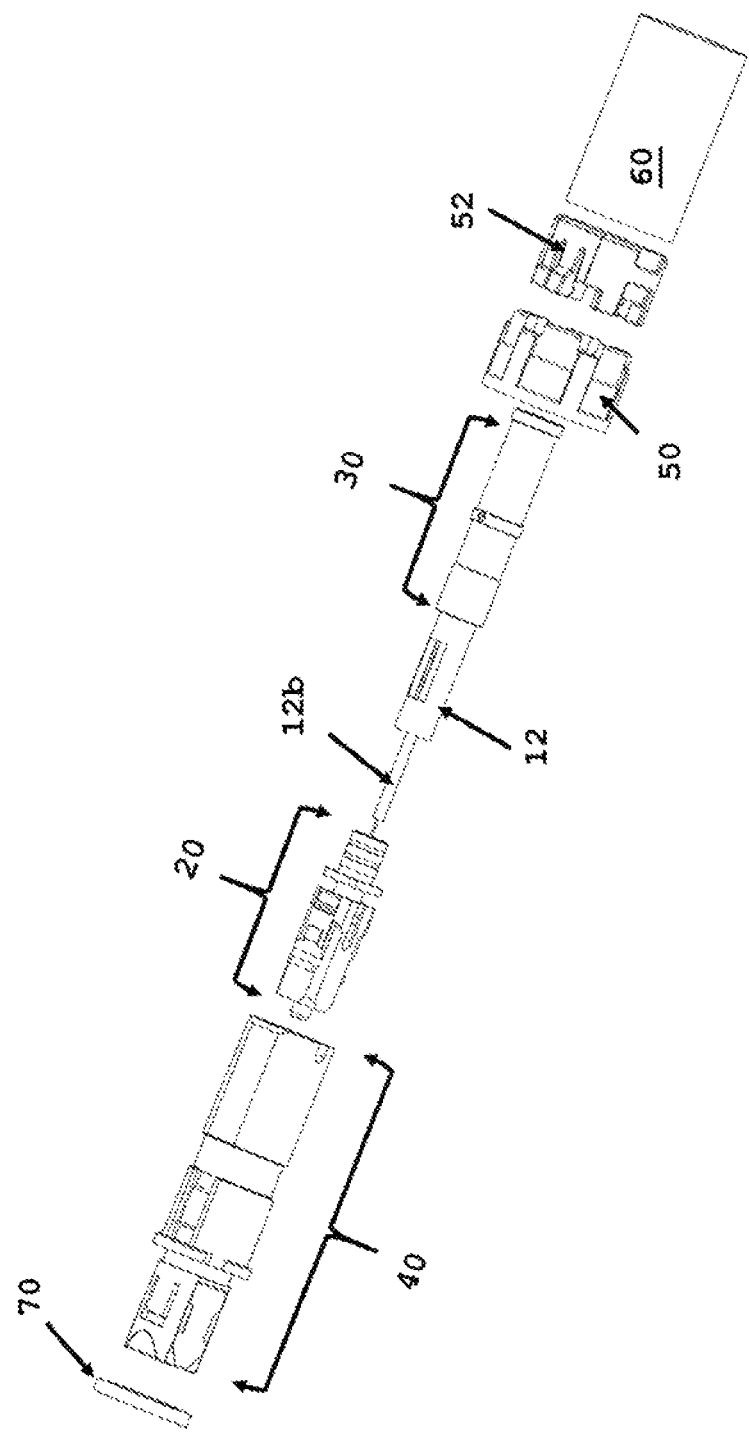
FIG. 2 is an exploded view of the connector assembly of FIG. 1.

FIG. 2 depicts an exploded view of the assembled connector assembly (10) of FIG. 1. Square ring (70) acts as an environmental seal, and further provides structural stability to the connector assembly (10). Coupling nut (50) is secured over the outer connector housing (40) and nut (50) is also structurally supported by square ring (70). The lock ring (52) is secured distally of the coupling nut (50), helping to prevent the coupling nut (50) from disconnecting from the adapter (refer to FIG. 10). As explained below in FIG. 10, the coupling nut (50) and lock ring (52)secures the fiber optic connector assembly (10) within a port of an adapter after the first fiber optic assembly (20) is fed through a duct. Outer connector housing (40) receives and secures the first fiber optic connector assembly (20) as described in FIG. 5. Optical fiber (22) has a sheath or outer cover (12b) that helps protect the optical glass fiber (22) from damage or breakage. Outer cable jacket (12) or micro duct sleeve, surrounds the sheathed (12b) optical glass fiber. The cable jacket may be scored to expose the strength members within the cable jacket as described in FIG. 5 and FIG. 6. Crimp tube assembly (30) is secured to the first fiber optic connector assembly (20) as described in FIG. 5 and FIG. 8. The final assembly step includes coupling nut (50), lock ring (52) and shrink tubing (60) to form the fiber optical connector assembly (10).

FIG. 3 and FIG. 4 depict the inner fiber optic connector (assembly 20) to which crimp tube assembly (30) is secured at the backpost (80). FIG. 3 depicts the first fiber optic connector assembly (20) comprising plug frame (24) that holds at least one ferrule (21) with an optical fiber (22). Plug frame (24) has opposing recesses (23a, 23b) that accept a corresponding outer connector housing latch (42a, 42b) (refer to FIG. 5). Backpost (80) is secured within the plug frame (24) by a pair of opposing latches (83a, 83b). Backpost (80) has a distal post (86) with flange (82) that acts as a stop face when the crimp ring assembly is inserted over the distal post. The distal post has at least one annular recess (81a-81c). The forward annular recess (81a) receives lip (35) formed on an inner surface of the crimp tube assembly (30) (refer to FIG. 7). The lip is compressed within the annular recess during crimping or when a radial compression force is applied to a first crimp zone (31) when securing the crimp tube assembly onto the backpost. Referring to FIG. 4, a cross-section of FIG. 3, illustrates the bias spring (11) that ensures the ferrule (21) is under sufficient load to form a communication pathway with an opposing fiber optic ferrule, as described in FIG. 10. Hooks or latches (83a, 83b) secure the backpost to the plug frame (24). Ferrule flange

(13) secures the ferrule (21) in optical communication with the incoming optical fiber within the cable jacket (12).

Figure 5:
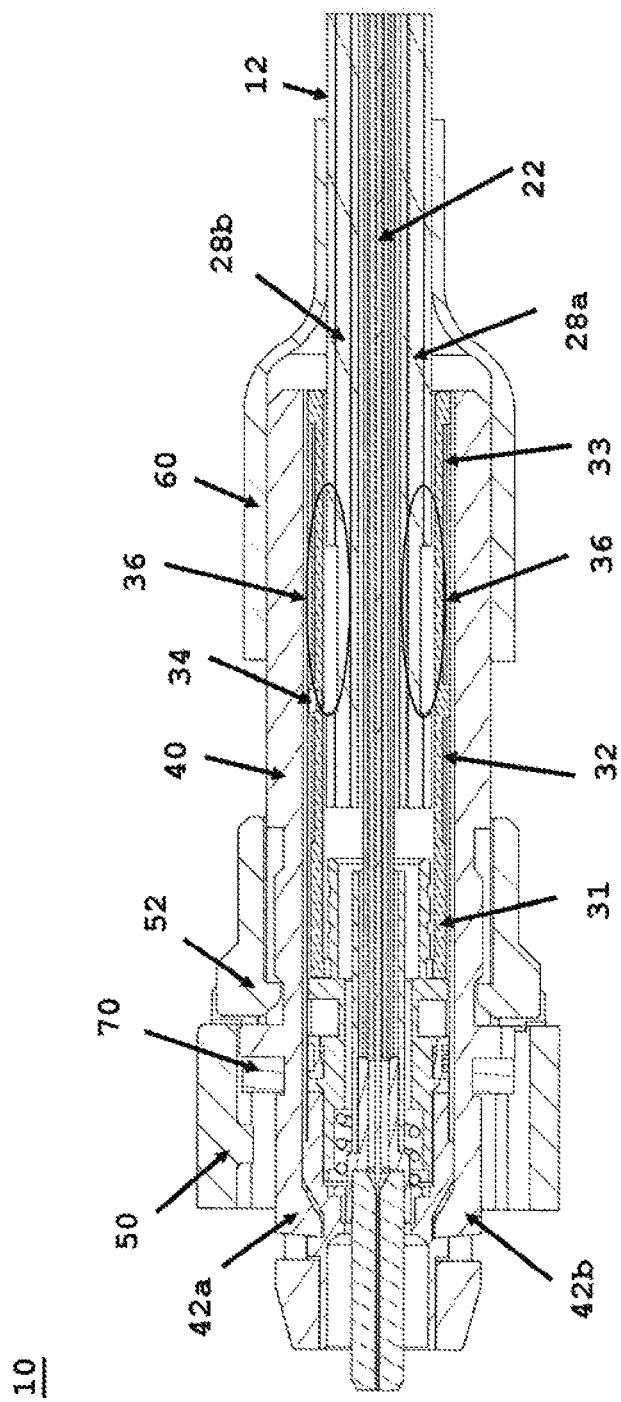
FIG. 5 is a cross-section view of FIG. 1.

FIG. 5 depicts a cross-section of the assembled fiber optical connector assembly (10) of FIG. 1. Incoming optical cable jacket or micro duct (12) further comprises one or more optical fiber (22) and strength members (28a, 28b). The strength members are typically a rod formed of glass or metal. The strength members for cabling used in microduct applications is not plurality of fiber strands such as Kevlar or synthetic polyester fiber with a high tensile strength. Shrinkage tubing (60) is placed about the cable jacket (12) and outer connector housing (40) nearer a distal end of the connector assembly (10). As illustrated the coupling nut (50) abuts square ring (70), and the combination acts as a seal against environmental ingress at proximal end of the connector assembly (10). The proximal end of the assembly (10) is defined as closer to the ferrule. Opposing latches (42a, 42b) secures the first fiber optic connector assembly (20) within the outer connector housing (40) via recesses (23a, 23b) located within the plug frame (24). Three crimp zones (31, 32, 33) illustrated in this embodiment. First crimp zone (31) secures a proximal end of the crimp tube assembly (30) with lip (35) within an annular recess (81a) about the backpost (80) at distal end. Second crimp zone (32) and third crimp zone are described in FIG. 8 below. A cavity (36) is formed between the second crimp zone (32) and third crimp zone (33) that receives an epoxy resin or glue when injected through injection port (34) formed in the crimp tube assembly (30). To increase tensile load strength, the cable jacket (12) is scored (12c) or cut-away (refer to FIG. 6) to expose strength members (28a, 28b) to the resin. The resin may be ultra-violet light cured or may cure over time.

Figure 8:
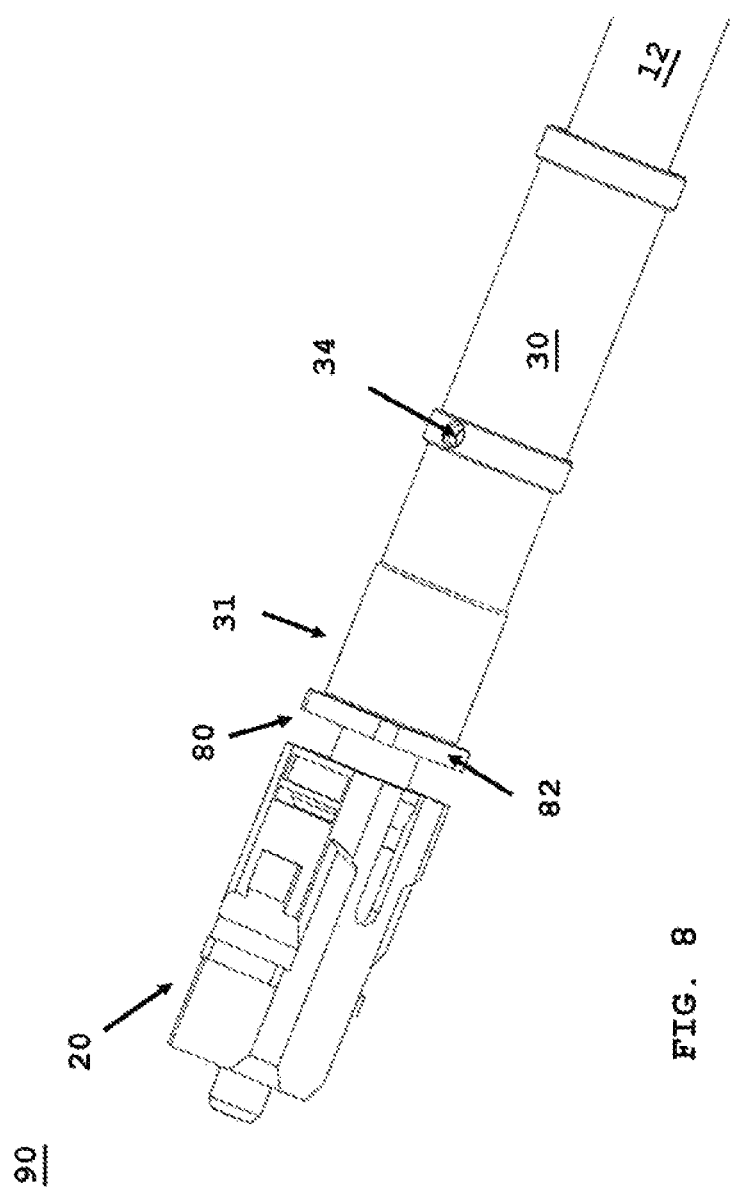
FIG. 8 is a perspective view of the crimp tube assembly, inner or first fiber optic connector assembly and cable jacket assembled.

FIG. 6 and FIG. 7 depicts the first fiber optic connector assembly (20) prior to inserted the cable jacket (12) or micro duct over distal post (86) of the backpost (80). The post (86) has one or more annular recesses (81a-81c). Cable jacket (12) is scored (12c) exposing strength members (28a, 28b) to injected resin. FIG. 7 depicts crimp tube assembly (30) with lip (35) on an inner surface of the assembly (30) at its proximal end. A first crimp zone (31), second crimp zone (32) and third crimp zone (33) are provided along the longitudinal length (L-L') of crimp tube assembly (30). An injection port (34) is provided to inject the resin within a cavity (36) (refer to FIG. 8) formed when the crimp tube assembly (30) is secured about the distal post (86), as illustrated in FIG. 8. Fully crimping crimp zone two (32), and then crimp zone three (33), provides a cavity (36) along the longitudinal bore (38) to receive the inject resin through the port (34).

FIG. 8 depicts the first fiber optic connector assembly (20) assembled with the crimp tube assembly (30). This intermediate assembly (90) is inserted into the outer connector housing (40) as depicted in FIG. 5 to form the fiber optical connector assembly (10) of FIG. 1.

Figure 9:
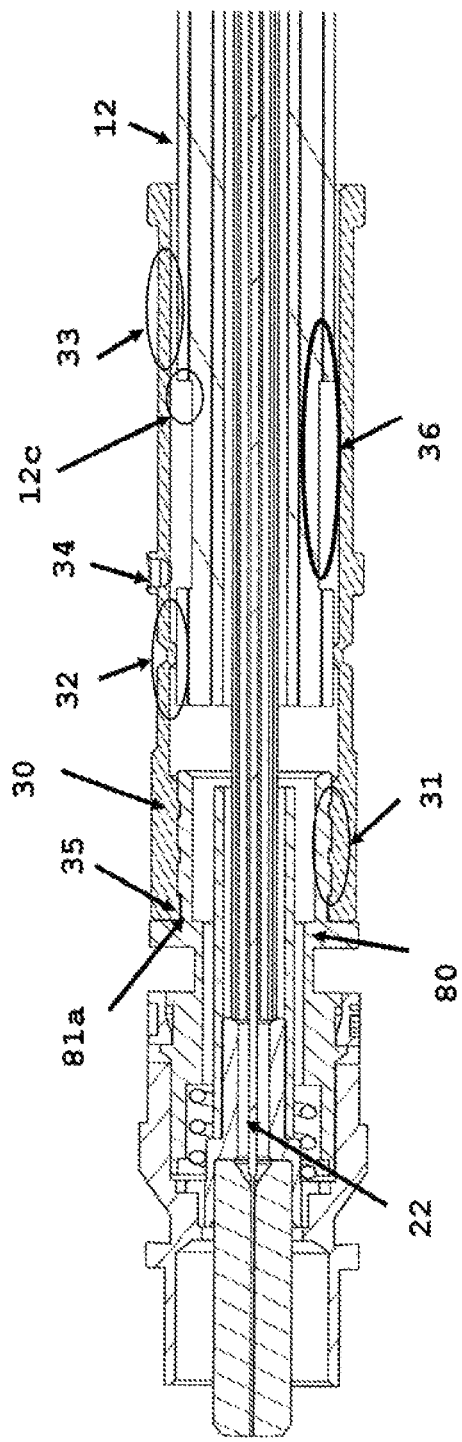
FIG. 9 is a cross-section view of FIG. 8.

FIG. 9 depicts lip (35) within annular recess (81a) after crimp zone one (31) is radially compressed. Crimp tube assembly (30) is formed of a thinner outer wall thickness to reduce the overall size FIG. 8 assembly. Referring to crimp zone one (31), the outer wall of the crimp tube assembly is deformed within the annular recesses (81b, 81c) increasing tensile strength or pull strength on the cable. Second crimp zone (32) illustrates crimp tube assembly wall deformed about cable jacket (12) thereby improving tensile load strength on the optical cable jacket. Crimp zone three (33) is deformed about the resin injected into cavity (36) surrounding cable jacket (12). Injection port (34) is used to inject the resin in the cavity formed between crimp zone two (32) and crimp zone three (33). FIG. 9 depicts a cut-out or scoring (12c) of cable jacket (12) or microduct to expose the strength member as described in FIG. 6 above. FIG. 9 illustrate a microduct (12) be secured within the crimp tube assembly (30), and in this embodiment an epoxy resin is injected through port (34) into cavity (36) defined by the second crimp zone (32) and third crimp zone (33). Prior to injecting epoxy, crimp zone one (31) and crimp zone two (32) are fully crimped. Epoxy is injected through port (34), then crimp zone three (32) is fully crimped. Fully crimped means a tool is used to apply a radial force at a point only the longitudinal length of the crimp tube assembly to radial deform and compress the outer surface of the crimp tube assembly to secure the cable jacket, duct, and/or epoxy to structure such as a backpost.

FIG. 10 depicts a prior art adapter configured to receive the fiber optical connector assembled (10) of FIG. 1. A similar adapter is disclosed in co-pending patent application Ser. No. 15/693,842. A bayonet connection (85a) accepts coupling nut (50). The adapter (85) is secured within a panel that terminates on the opposing side (89a, 89b) (refer to FIG. 11) with a second fiber optic connector in optical communication with the first fiber optic connector (20) when the fiber optical connector assembly (10) is secured to the first end (89a). Referring to FIG. 11, threads (87) secure to inner threads of coupling nut (50). To improve environmental ingress, one or more seals (88a, 88b) are provided.

According to another embodiment of the present invention, a method of assembling the fiber optical connector assembly (10) of FIG. 1 is disclosed. In step one, a fiber optic connector assembly (20) is provided at a second end of a duct. A crimp ring assembly (30) is inserted over a post (86) formed as part of backpost (80) as illustrated at FIG. 6. At Step two, a first crimp zone one (31) is fully crimped about post (86), as shown in FIG. 9. A second crimp zone two (32) is fully crimped. At Step 3, an epoxy resin is injected into a port (34) that is in communication with a cavity (36) that is formed between the second crimp zone two (32) and the third crimp zone three (33). In Step four, the third crimp zone three (33) is fully crimped resulting in the assembly (90) of FIG. 8. In Step five, the assembly of Step four is inserted into an outer connector housing (40), and a coupling nut (50) and then a lock ring (52) are inserted from a distal end of the housing (40). As part of Step 5, heat shrinkable tubing (60) is secured over a portion of the distal end of the connector housing (40) and the cable jacket (12). Alternatively, Step 2 may include scoring (12c) a portion of the cable jacket (12) to expose one or more optional strength members (28a, 28b) prior to injecting the resin. The resin fills the void left by scoring and improves tensile load when the strength members are bonded to the inner wall of the crimp tube assembly (30).

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions, or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, " a system having at least one of A, B, and C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will also be understood by one skilled in the art all language such as "up to," "at least," and the like include the number recited and refer to ranges which can be subsequently broken down into subranges as discussed above.

What is claimed is:

1. A fiber optical connector assembly comprising:
an optical fiber cable including a cable jacket and optical fibers within the cable jacket;
an optical fiber ferrule terminating at least one of the optical fibers of the optical fiber cable;
a connector housing receiving the optical fiber ferrule and comprising a backpost;
a crimp tube assembly secured to the back post, the crimp tube assembly comprising a first end portion and a second end portion spaced apart along a longitudinal axis, the crimp tube assembly defining a first crimp zone, a second crimp zone, and a third crimp zone spaced apart along the longitudinal axis, the second crimp zone being located on one side of the first crimp zone along the longitudinal axis of the crimp tube assembly, the third crimp zone being located on a longitudinally opposite side of the second crimp zone from the first crimp zone, the first crimp zone crimped onto the backpost, the second crimp zone crimped onto the cable jacket of the cable, and the third crimp zone crimped onto the cable jacket of the cable, the crimp tube assembly further comprising an access port extending radially with respect to the longitudinal axis at a location spaced apart between the second crimp zone and the third crimp zone along the longitudinal axis, the crimp tube assembly defining a space extending radially between the cable jacket and the crimp tube assembly and longitudinally from the second crimp zone to the third crimp zone; and
cured epoxy located in the space, the epoxy having been received into the space through the access port.

2. The fiber optical connector assembly of claim 1, wherein the cable jacket is scored along the space such that the epoxy bonds the crimp tube assembly to strength members exposed by said scoring.

3. The fiber optical connector assembly of claim 1, wherein the connector housing is a non-rugged connector housing, the fiber optical connector assembly further comprising a rugged connector housing receiving the non-rugged connector housing therein.

4. The fiber optical connector assembly of claim 1, wherein the first end portion of the crimp tube assembly comprises an inner lip and the backpost comprises an annular groove, the inner lip being a prefabricated lip compressed into the annular groove by the crimping at the first crimp zone.

5. The fiber optical connector assembly of claim 4, wherein the inner lip lies in a plane perpendicular to the longitudinal axis and extends 360° about the longitudinal axis such that inner lip completely encircles the longitudinal axis.

6. The fiber optical connector assembly of claim 4, wherein the first crimp zone encompasses the inner lip.

7. The fiber optical connector assembly of claim 1, further comprising a square ring for sealing a first end of the fiber optic connector assembly against environmental ingress.

8. The fiber optical connector assembly of claim 1, wherein the connector housing is a non-rugged connector housing, the fiber optical connector assembly further comprising a rugged connector housing receiving the non-rugged connector housing therein and a coupling nut configured to be threaded onto an adapter.

9. The fiber optical connector assembly of claim 8, further comprising a lock ring configured to lock the coupling nut in relation to the adapter to inhibit unthreading the coupling nut from the adapter.

10. The fiber optical connector assembly of claim 1, wherein the strength members are not fiber strands such as Kevlar.

11. The fiber optical connector assembly of claim 1, wherein the second crimp zone seals the crimp tube against the cable jacket.

12. The fiber optical connector assembly of claim 1, wherein the fiber optical connector assembly has a pull strength of at least 650 N.

13. The fiber optical connector assembly of claim 1, wherein the fiber optical connector assembly has a pull strength of about 650 N to 670 N.

\* \* \* \* \*